United States Patent [19]

Zeldman et al.

[11] 3,723,737
[45] Mar. 27, 1973

[54] INFRARED DETECTION AND CONTROL DEVICE

[75] Inventors: Maurice I. Zeldman; Edward J. Walker; Suresh K. Gupta, all of Pittsburgh, Pa.

[73] Assignee: North America Rockwell Corporation, Pittsburgh, Pa.

[22] Filed: May 18, 1971

[21] Appl. No.: 144,518

[52] U.S. Cl.............250/83.3 H, 250/217 SS, 250/221
[51] Int. Cl...............................................G01j 1/00
[58] Field of Search.........250/83.3 H, 211 J, 217 SS, 250/221

[56] References Cited

UNITED STATES PATENTS

| | | | |
|---|---|---|---|
| 3,534,351 | 10/1970 | Harnden, Jr. et al. | 250/221 X |
| 3,551,682 | 12/1970 | Kerhoas et al. | 250/217 SS X |
| 3,652,859 | 3/1972 | Toussaint | 250/217 SS X |

Primary Examiner—Archie R. Borchelt
Attorney—John R. Bronaugh, Floyd S. Levison, E. Dennis O'Connor and Richard A. Speer

[57] ABSTRACT

An electronic detection and control device comprising a first electronic circuit means having its input connected to an electrical source, the output of said first electronic circuit means connected to at least one radiation-emitting semiconductor device, said first electronic circuit means adapted to provide electrical energy to said semiconductor device to excite said semiconductor device to produce a radiated signal, said radiated signal defining a radiation screen, a radiation-sensing semiconductor device whose input is adapted to receive said radiated signal, the output of said radiation-sensing semiconductor device connected to a second circuit means, said second circuit means adapted to provide an output signal responsive to the presence or absence of any obstruction in said electronic screen, or responsive to the presence or absence of any ambient radiated energy received by said radiation-sensing semiconductor device.

6 Claims, 4 Drawing Figures

INVENTORS
Maurice I. Zeldman,
Edward J. Walker &
Suresh K. Gupta

INVENTORS
Maurice I. Zeldman,
Edward J. Walker &
Suresh K. Gupta

INFRARED DETECTION AND CONTROL DEVICE

BACKGROUND OF THE INVENTION

The present invention relates to an electronic detection and control device of the type adapted to be responsive to the presence or absence of a physical object within a specified area or responsive to any excessive ambient radiated energy.

This type of device has two broad areas of application. One such area may be generally described as providing protection for machine operators. In particular it is important from a safety point of view that the entire body of the operator be clear from a specified area around the machine during certain cycles of the machine. If for example, the machine were a power press, the operator's hands must be removed from the die area of the press while the press is being actuated. To insure that the operator takes this action, safety devices, such as mechanical pull-back devices, have been provided. This type of device is essentially mechanical and is provided with "handcuffs" fitted about the wrists of the operator. The cuffs will automatically remove the operator's hands from the die area during press actuation. If the operator should remove the cuffs from his wrists, the machine will be bypassed and continue to operate.

Other mechanical devices have been provided but are easily avoided by merely disconnecting a linkage or other part. The motivation for taking such action might result from a "piece-work" scheme in which the operator wishes to improve his speed believing that he can "beat" the machine.

Electronic devices have also been used for the protection of machine operators. Photo-electric relays and other comparable devices have been used to sense the interruption of a projected light beam. The interruption of the beams may be caused by the presence of a physical object, such as an operator's hand. This type of device may be associated with systems for stopping the press in response to the presence of the physical object. While these devices have gone part way in protecting the operator, they may also be bypassed by means such as excessive ambient radiated energy. This energy may be accidentally or purposefully introduced to the sensing portion of the device to disrupt its operation. An infrared heater, sunlight, or a strobe light may accidentally cause such disruption of the device while an operator's flashlight may purposefully be used to the same end.

The second broad area of application is the "security" area. The purpose of a device applied to this area would be to sense the presence of a foreign object within a defined area, such as an entrance to a bank vault. A secondary purpose might be to sense the presence of smoke or other types of clouding, such as a steam leak. The above-mentioned electronic devices would be most pertinent to this area and have been found deficient for many of the same related reasons.

SUMMARY OF THE INVENTION

It is, therefore, a primary object of the present invention to provide an electronic detection and control device which is responsive to the presence or absence of any obstruction within a defined area, or responsive to the presence or absence within a defined area of any excessive ambient radiated energy.

It is yet another important object of the present invention to provide an electronic detection and control device that is adapted to be used to control the operation of a power apparatus, such as a power press, whereby it protects the operator from the hazard of coming into contact with the working parts of the apparatus during predetermined operating cycles of the apparatus.

It is still another important object of this invention to provide an electronic detection and control device which will provide a protective signal to an associated apparatus should any of the device's important components or their associated circuits fail as a result of a short or open or should the power source for the device fail.

It is still another object of this invention to provide an electronic detection and control device which is "operator proof" and whose operation will not be disrupted by excessive ambient radiated energy.

It is yet another object of this invention to provide an electronic detection and control device which is adapted to sense the presence of a physical object, such as smoke or steam.

It is still another object of this invention to provide an electronic detection and control device comprising a first electronic circuit means having its input connected to an electrical source, the output of said first electronic circuit means connected to at least one radiation-emitting semiconductor device, said first electronic circuit means adapted to provide electrical energy to said semiconductor device to excite said semiconductor device to produce a radiated signal, said radiated signal defining an electronic screen, a radiation-sensing semiconductor device whose input is adapted to receive said radiated signal, the output of said radiation-sensing semiconductor device connected to a second circuit means, said second circuit means adapted to provide an output signal responsive to the presence or absence of any obstruction in said electronic screen, or responsive to the presence or absence of any ambient radiated energy received by said radiation-sensing semiconductor device.

It is yet another object of the present invention to provide an inexpensive, efficient, effective, compact electronic detection and control device.

These and other objects of the invention, as well as the advantages thereof over the prior art forms, will become apparent from the following detailed description of the attached drawings and are accomplished by means herein described and claimed.

One preferred embodiment of the present invention is shown by way of example in the accompanying drawings and is described in detail without attempting to show all the various forms and modifications in which the invention might be embodied; the invention being measured by the appended claims and not by the details of the specification.

DESCRIPTION OF THE PREFERRED EMBODIMENT

Figure 1:
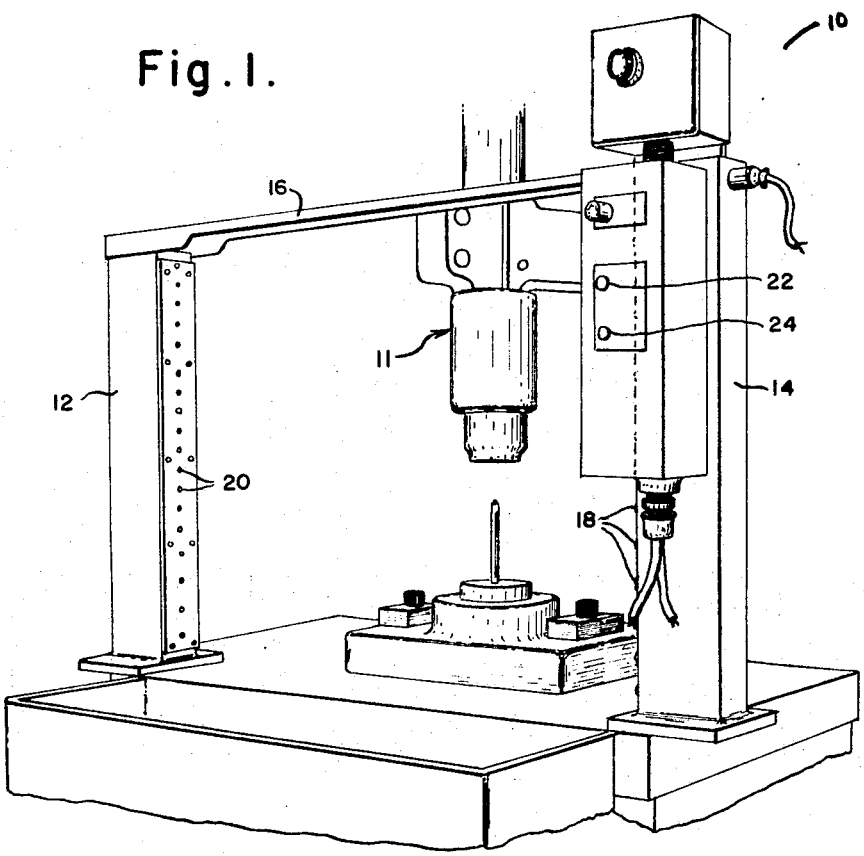
FIG. 1 is a general perspective view of one form of an electronic detection and control device in accordance with the present invention.

Referring now to the drawing and particularly to FIG. 1, there is therein shown one form of electronic detection and control device 10 which is adapted to be used in associated with a power apparatus such as a press (not shown).

The device 10 may comprise two columns 12 and 14 connected by a member 16. Column 14 is adapted to house and support an array of radiating diodes 18 which may be spaced on 2-inch centers. Column 12 is adapted to house and support an array of phototransistors 20, which may be spaced on 1-inch centers.

The radiating diodes, such as infrared diodes 18, are excited with high current pulses at a predetermined frequency in a manner to be later explained. The modulated infrared radiation signals emitted by the diodes 18 are thus detected by the array of phototransistors 20. After proper amplification, the signal is transmitted to the associated control circuitry in a manner to be later described. The circuitry is suitably housed in a compact fashion.

The control circuit constantly compares the received signal with the transmitted signal emitted by the diodes 18. Whenever there is a physical obstruction placed between the diodes 18 and phototransistors 20, the received signal differs from the transmitted signal. This situation is detected by the circuitry, which develops a signal which may be used to control an associated apparatus, such as the press. The control could take the form of immediately braking the action of the press by suitable means. Indication lights 22 may be provided to indicate an obstruction, and alarms and other warning devices (not shown) may also be suitably provided.

Additionally, the operation of the device 10 will not be disrupted to stray and excessive ambient infrared radiation. This ambient radiation may be accidentally or purposefully caused. If, for example, should some content of stray radiation manage to fall on the phototransistors 20, the thus generated "ambient" signal will be compared by the circuitry, and the resultant signal will be comparable to the obstruction signal and may be used in the same manner to stop an apparatus, such as the action of a power press. This activity may also be noted by a separate indication light 24.

The device 10 has been so provided to develop a substantially rectangular sensing curtain or screen, but it is obvious that it may be varied depending on application (e.g., protective vs. security; type of machine; type of object being serviced, etc.).

Figure 2:
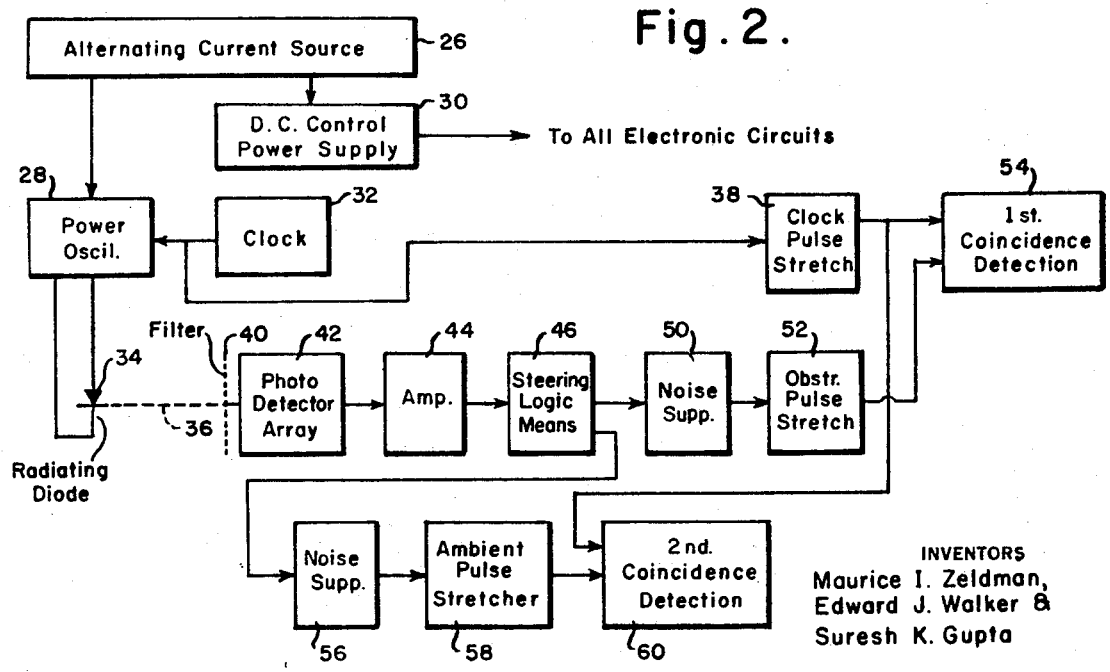
FIG. 2 is a block diagram showing the components in accordance with the invention.

Referring now to FIG. 2, there is therein shown a block diagram showing the components in accordance with the present invention. An alternating current source 26 is connected to a power oscillator 28.

The A.C. source 26 is also connected to D.C. control power supply 30 which will provide D.C. power for the associated electronic circuits. An electronic clock 32, which might typically be a commercially available programmable unijunction transistor oscillator, is connected to the power oscillator 28 to control the pulsing frequency of oscillator 28. The output of the oscillator 28 will excite the radiating diodes 34. The diodes 34 may be set in an array of at least one diode and may be typically commercially available gallium arsenide diodes. The diodes 34 will be so driven by the oscillator 28, whereby the emitted radiated signal will be in pulsed form. The pulsed signals will thereby form a radiation screen 36.

The clock 32 is also connected to a clock pulse stretcher 38, which may be typically a commercially available "one-shot" multivibrator.

The pulse stretcher 38 transforms the clock pulse into a square wave synchronizing pulse having a predetermined pulse-width time.

The radiation screen 36 passes through a filter 40, which may typically be a commercially available suitable glass or plastic material. The filter 40 filters radiation frequencies different from the band width of the radiation emission frequency of the radiating diodes 34. The radiation screen 36 is then received by photodetecter array 42. The detectors which may comprise the array 42 may be typically commercially available phototransistors.

The received signals are then amplified by an amplifier 44. The amplifier is connected to a steering logic means 46 which steers the information signals received from the amplifier 44 to the respective circuits associated with the first and second coincidence detection circuits 54 and 60. An output signal of the steering logic means 46 is passed through a first electrical "noise" suppression circuit 50 which will allow the signal to proceed but will remove all unwanted interference having a time duration less than that of the received signal.

The first noise suppression circuit 50 is connected to the input of a first obstruction pulse stretcher 52, which will transform the so received signal into a square wave pulse having a pulse-width time substantially equal to the transformed synchronizing pulse.

The transformed synchronizing pulse and the transformed received pulse will then be electronically compared in a first coincidence circuit 54. The output signal of the first coincidence circuit 54 will remain at a logic value of zero so long as the synchronizing and received signals are coincident with respect to time. If, however, there should be any physical obstruction in the radiation screen 36, then there would be initially no signal received by that portion of the photodetector array 42 in line with the obstruction. Therefore, there will be an absence of a pulsed signal from the obstruction pulse stretcher 52. The output signal of the first coincidence circuit 54 will be then at a logic value of one so long as the synchronizing and received signal are not coincident. It should be noted that it is the synchronizing signal that remains constant and provides the measuring base, while the received signal changes according to the presence or absence of an obstruction in the radiation screen 36.

Another output of the steering logic means 46 is passed through a second electrical noise suppression circuit 56 which will allow the signal to proceed, but will remove all unwanted interference having a time duration less than that of the received signal. The second noise suppression circuit 56 is connected to the input of an ambient pulse stretcher 58, which will transform the so received signal into a square wave pulse wave having a pulse-width time substantially equal to the transformed synchronizing pulse.

The transformed synchronizing pulse and the transformed received pulse will then be electronically compared in a second coincidence circuit 60. The output signal of the second coincidence circuit 60 will remain at a logic value of zero so long as the synchronizing and received signals are coincident with respect to time. If however, there should be any excessive ambient radiated energy from a continuous or pulsed or intermittent source, as may be caused by sunlight, flashlight, infrared heater, or strobe-type light source received by the photodetector array 42, photodetector array 42 will then be "turned on" accordingly. That is, it will transmit an output signal having a wave form different than the wave form of the synchronizing signal. This difference will then be detected by the second coincidence detector circuit 60. The output signal of the second coincidence circuit 60 will be then at a logic value of one so long as the synchronizing and received signal lack coincidence. It should also be here noted that is the synchronizing signal that remains constant and provides the measuring base, while the received signal changes according to the presence or absence of excessive ambient radiated energy introduced into the radiation screen 36.

Figure 3:
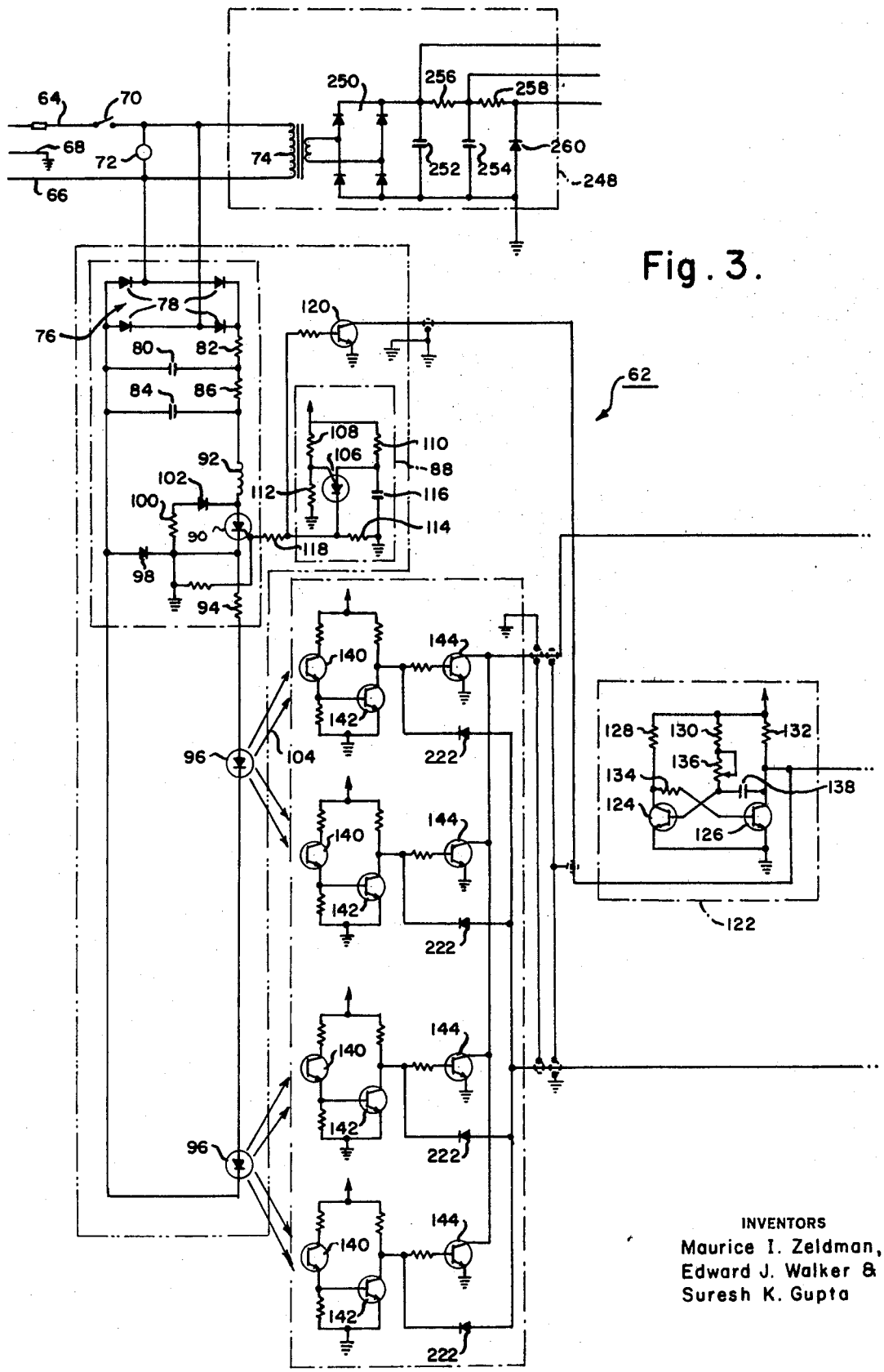
FIG. 3 and 3A combined comprise a schematic wiring diagram of the system of FIG. 2.
Figure 3A:
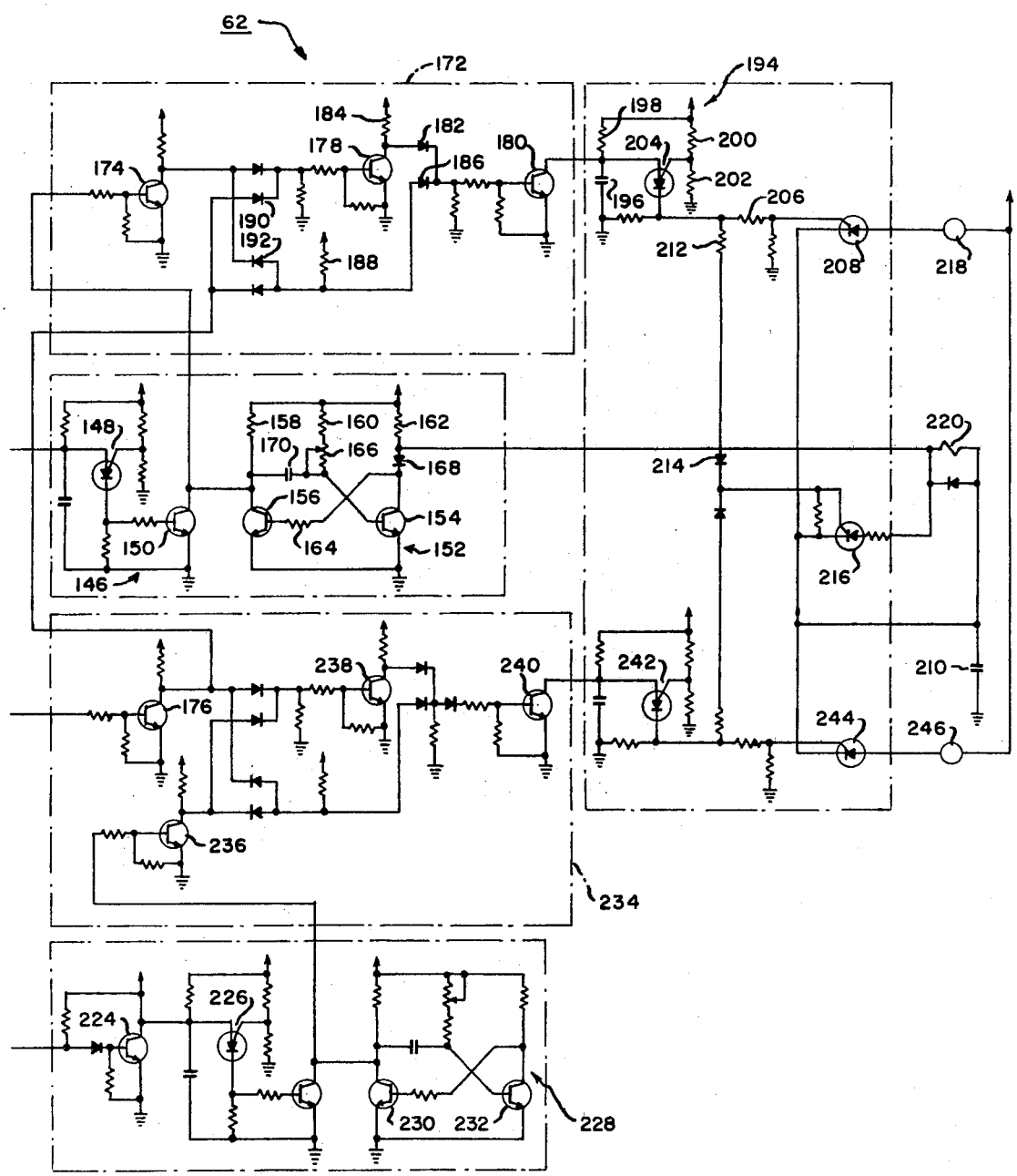

It should also be noted that by so providing an electronic detection and control device, as depicted in FIGS. 1, 2 and 3, which will be later explained, the first coincidence electronic circuit 54 and the second coincidence circuit 60 will also transmit a signal in response to short or open condition in any important part of the device as well as any failure of the A.C. source 26. This means that upon occurrence of any of the above-mentioned failures, a signal would be generated to immediately control an apparatus such as a power press.

Now referring to FIG. 3, there is therein shown a specific circuit 62 for controlling a typical power press (not shown) embodying the concepts of the present invention, and having input terminals 64 and 66, and ground terminal 68. Input line voltage is a typical application for 117 Vac signal phase. Switch 70 contact is switched to apply line power to a light 72, to a step-down transformer 74, to a silicon diode rectifier bridge 76 comprising silicon diodes 78, which might typically rectify the A.C. input to obtain a D.C. voltage across capacitor 80. Resistor 82 limits the peak currents flowing into capacitor 80 at typically a 120 Hertz rate. Capacitor 84 is also charged to the same value and polarity of voltage as capacitor 80 through resistor 86.

Logic means 88 is used to turn on SCR 90 by a single pulsed gate signal at a fixed repetition rate. This will allow a pulse of current to flow from capacitor 84, through reactor 92, SCR 90, resistor 94, infrared diodes 96 and then back to capacitor 84. This current will resonantly reverse the polarity on capacitor 84 and reduce to a zero value. Then the current will reverse its flow from capacitor 84, through diode 98, resistor 100, diode 102, reactor 92, and back to capacitor 84. This will reverse the polarity of the voltage across SCR 90 during the same time interval that the forward current is zero value through SCR 90. Therefore, SCR 90 will recover its forward blocking state. This current will also resonantly return the voltage across capacitor 84 to its original polarity and conditions are ready to repeat another cycle. The object of this repeating function is to pass pulses of current through the infrared diode 96, which will emit infrared radiation signals when they are so excited. Since the infrared diodes 96 are all pulsed at the same time, and therefore, emit infrared radiation at the same time, they form a curtain or screen 104 of radiation formed at a predetermined repetition rate.

The clock or logic means 88, which is used to determine the repetition rate, might typically be a relaxation oscillator using a programmable unijunction transistor 106; and resistors 108, 110, 112, 114 and capacitor 116. This circuit delivers the gate pulse current to SCR 90 through resistor 118 to initiate the transmitted signal. This "clock pulse" is amplified by transistor 120 and is also transformed into a square wave synchronizing pulse having a predetermined pulse width time, by a typical one-shot oscillator pulse stretcher 122 using transistors 124, 126; resistors 128, 130, 132, 134; pot 136; and capacitor 138. The transmitted signals are received by the array of phototransistors 140. The received signals are then amplified respectively by transistors 142 and then inverted respectively by transistors 144. The signals at this point are all paralleled and passed through a noise suppression circuit 146 using a programmable unijunction transistor 148, which will allow the signal to pass through, but will not pass unwanted interference having a time duration less than that of the received signal. This received signal, that is passed through, will one-shot turn on transistor 150, which will activate a one-shot pulse stretcher 142 152 transistors 154 and 156; and resistors 158, 160, 162, 164; pot 166; diode 168; and capacitor 170, which will transform the received signal into a square wave pulse having a pulse width time approximately equal to that of the transformed synchronizing pulse.

The transformed synchronizing pulse and the transformed received pulse will now be compared in coincidence detection circuit 172, which will function in the following manner: When the base of transistor 174 receives a logic "1" signal, its collector output signal will be at logic "0" state. Conversely, when there is a "0" signal at the base of transistor 174, its collector output signal will be a "1." Transistor 176 performs in a like manner. Therefore, if the received and the synchronizing signals are both "1," the outputs of transistor 174 and 176 will be "0." The base signal of the transistor 180 will be "1" through diode 182 and resistor 184; therefore, the collector output signal of transistor 180 will be "0." Likewise, if the received and synchronizing signals are both "0," the outputs of transistor 174 and transistor 176 will be "1," the base signal of transistor 178 will be "1" and the collector of transistor 178 will be "0." However, the base signal of transistor 180 will still be "1" through diode 186 and resistor 188; therefore, the collector output signal of transistor 180 will still be "0." Thus, the output of transistor 180 will remain at "0" as long as the synchronizing and received signals are coincident with respect to time.

If an obstruction should appear in the screen 104, then one or more of the obstructed phototransistors 140 will not receive a transmitted signal. There would then be a "0" signal on the base of the associated transistor 142 and the collector of the so effected transistor 142 would be a "1." The base signal would be a "1" on associated transistor 144 and its collector output signal would be a "0." (This will be true even though the other signals are received.) Therefore, the base signal of transistor 150 will be a "0" and its collector and the base signal of transistor 174 will be a "1." The collector of transistor 154 remains at "0" during the period of obstruction, thereby stopping the supply of energizing pulses to the relay coil 220 causing it to deenergize. At the same time, when the collector signal of transistor 150 goes to "0," the collector signal of transistor 174 will also be at "0." In this same time interval, the synchronizing signal will appear as a "1" on the base of transistor 120 causing a "0" on the collector of transistor 120, transforming the synchronizing pulse into a square wave signal of a "0" on the base of transistor 176, and a "1" on the collector of transistor 176. This will appear as a "1" signal on the base of transistor 178 through diode 190, giving a "0" signal on the collector of transistor 178 and the base of transistor 180. From above, since there will be a "0" signal on the collector of transistor 174, the current will flow through diode 192 to ground, leaving a "0" signal on the base of transistor 180. Since both input signals to the base of transistor 180 are "0," there will be a "1" signal on the collector of transistor 180, which will allow the noise suppressor (including sensitivity adjustment) and pulse generator circuit 194 using capacitor 196; resistors 198, 200, 202; and programmable unijunction transistor 204 to generate a gate pulse of current through resistor 206, the gate of SCR 208 and through the power press foot switch reset contacts 210, which are normally open, but would be closed during press operation. A parallel path will also deliver a gate pulse of current through resistor 212, diode 214, the gate of SCR 216, and through the foot switch reset contacts 210. The turn-on of SCR 208 would light the obstruction indication light 218 and the turn-on of SCR 216 ensures that the current remains shunted away from the relay coil 220 causing it to remain deenergized even though the obstruction is removed. The punch press will not operate until the relay coil 220 and its associated circuitry has been reset by the operator through the foot switch contacts 210.

An additional important feature of this device is that it is capable of detecting radiated energy from a continuous pulsed or intermittent source as may be introduced within the screen 104. This may occur accidentally as by an infrared heater or strobe-type energy source, or purposefully as by a flashlight. This is achieved by the following means: The collector output signals of transistors 142 are monitored through diodes 222. These signals are then paralleled, inverted by transistor 224, noise suppressed by programmable unijunction transistor 226, transformed by pulse stretcher 228, using transistors 230 and 232, and compared for coincidence by the coincidence detection circuit 234, with the synchronizing signal by transistors 176, 236, 238 and 240. As long as excessive ambient radiation is not received by any one of the phototransistors, there will be a "0" output signal at the collector of transistor 240. Should any of the collector signals of transistor 142 be always "0" due to excessive ambient, the ambient detection circuit and the coincidence detection circuit 234 will cause the output signal at the collector of transistor 240 to be "1." (The operation of these circuits is similar to the operation of the obstruction detection circuit and the coincidence detection circuit 172). The "1" output signal from the collector of transistor 240 will turn on programmable unijunction transistor 242 (which will operate similar to the description of the operation of noise suppression and pulse generator circuit 194 using programmable unijunction transistor 204), which will deliver a gate pulse to SCR 244, which will turn on SCR 244, which will turn on the excessive ambient radiation indication light 246, and in the same time interval in a parallel path, the pulse generator 242 will deliver a gate pulse to SCR 216, which will turn on SCR 216, which will shunt current away from the relay coil 220, which will cause relay coil 220 to deenergize, which will, in manner as before described, stop the operation of the press.

The D.C. power for the control circuits might typically be derived from the circuit 248, which consists of a step-down transformer 76, a D.C. bridge rectifier 250, filter capacitor 252, filter capacitor 254, filter resistors 256, 258, and zener reference diode 260.

An additional important feature is to provide a circuit which will generate a signal in response to a short or open condition in its important components or associated circuitry as well as in response to any failure to the power supply. This signal could also be used to operate a relay to control the operation of a power press.

An example of a "short condition" detection can be illustrated if transistor 154 should for some reason fail "short." This malfunction will deenergize the output relay coil 220. This will stop the operation of the press because the relay coil 220 is energized through the same resistor 162 that is used in the pulse stretcher circuit 152. Accordingly, this failure will have the same result in terms of operating the relay as would occur if there was an obstruction in the screen 104.

Although the above embodiments have been directed to the use of discrete components, it should be understood that other circuit technology could be employed within the scope of the invention. That is, integrated circuits and other similar circuit technology could be used to provide an electronic detection and control device in accordance with this invention.

While certain specific embodiments have been alluded to for the purpose of illustration, it is to be understood that the present invention can be applied to various uses and adaptations that may be made therein, as will be apparent to a person skilled in the art.

We claim:

1. An electronic detection and control device comprising a first electronic circuit means having its input connected to an electrical source, the output of said first electronic circuit means connected to at least one radiation-emitting semiconductor device, said first electronic circuit means adapted to provide electrical energy to said semiconductor device to excite said semiconductor device to produce a radiated signal, said radiated signal defining a radiating screen, a radiation sensing semiconductor device whose input is adapted to receive said radiated signal, the output of said radiation sensing semiconductor device connected to a second circuit means, said second circuit means adapted to provide an output signal responsive to the presence of absence of any obstruction in said electronic screen, or responsive to the presence or absence of any ambient radiated energy received by said radiation sensing semiconductor device, said first circuit means is adapted to provide an output signal responsive to an open or short condition in any of the components or circuits of said device and responsive to any failure of said electrical source.

2. An electronic detection and control device in accordance with claim 1 wherein said first circuit means is further provided with electronic timing means whose output signal controls the timing of the output of the first electronic circuit means.

3. An electronic detection and control device in accordance with claim 2 wherein said second circuit means is further provided with means to amplify the output signal of said radiation-sensing semiconductor device and means to then steer and invert the thus amplified signal and means to then suppress stray electrical signals and means to then increase the duration of the signal, said electronic timing means further providing an output signal which is increased in duration by a third electronic circuit means, a fourth circuit means to electronically compare the time coincidence of the output signals of said second circuit means with the output signal of said third circuit means, whereby said fourth circuit means will provide an output signal responsive to whether or not said output signals of said second and third circuit means are coincident with respect to time.

4. An electronic detection and control device in accordance with claim 3 wherein said first electronic circuit means is an oscillator.

5. An electronic detection and control device in accordance with claim 4 wherein said oscillator is in series with said radiation-emitting semiconductor device, and wherein said radiation-emitting semiconductor device is an infrared diode.

6. An electronic detection and control device in accordance with claim 3 wherein the output signal of said fourth circuit means will control the control device of an associated apparatus.

* * * * *